United States Patent Office 3,496,049
Patented Feb. 17, 1970

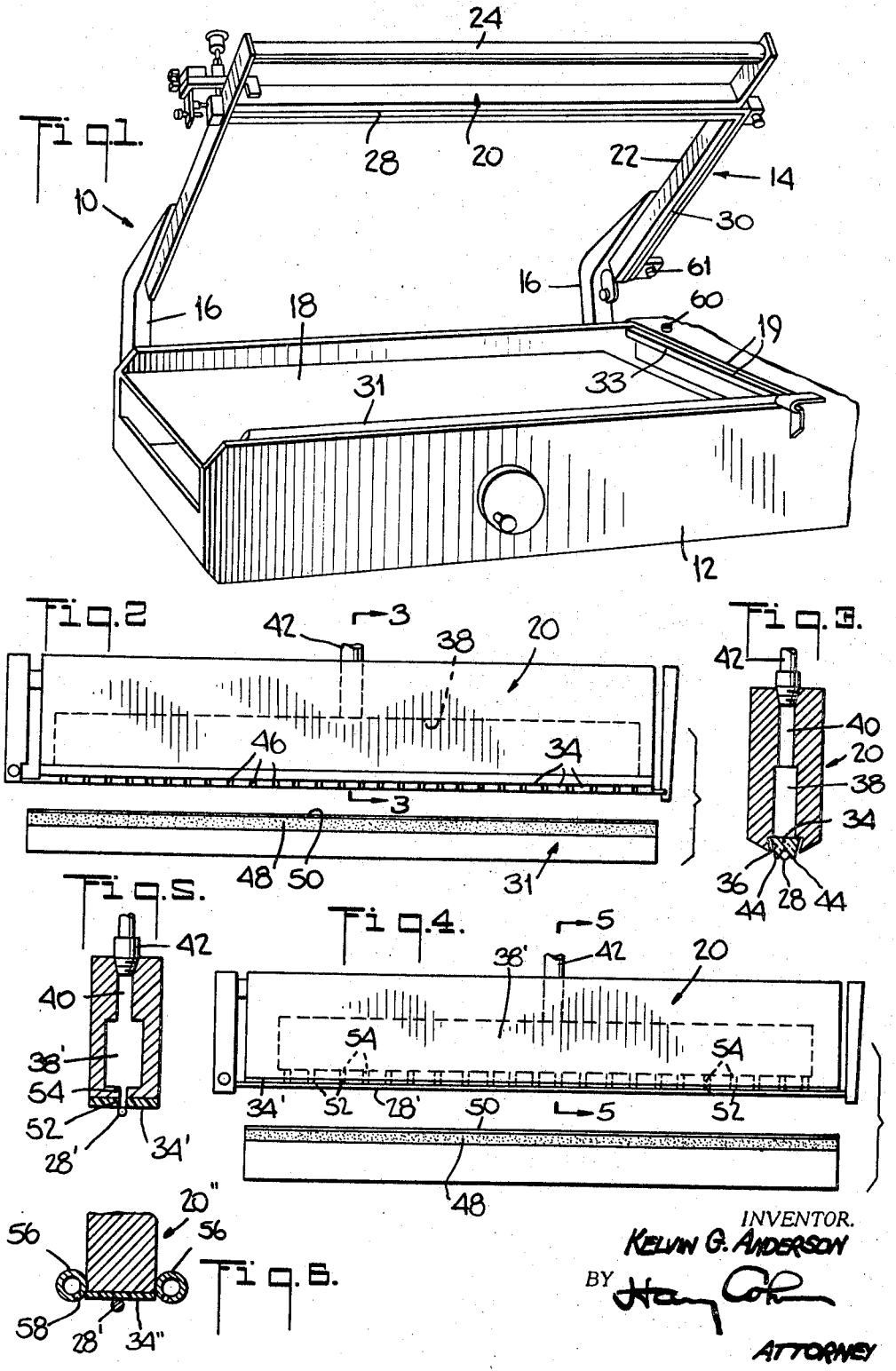

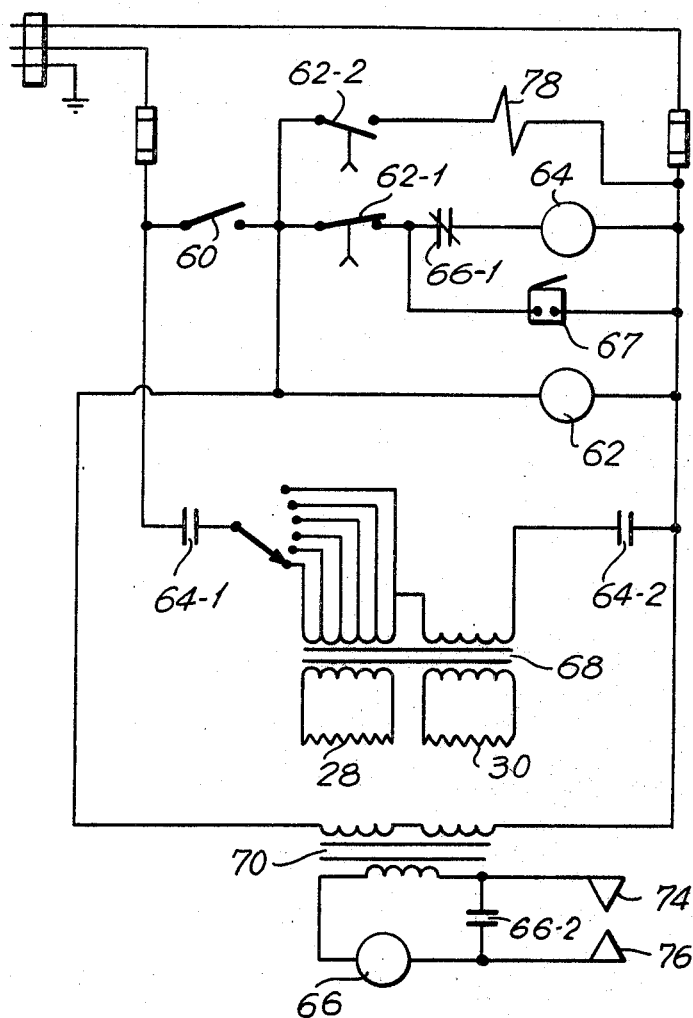
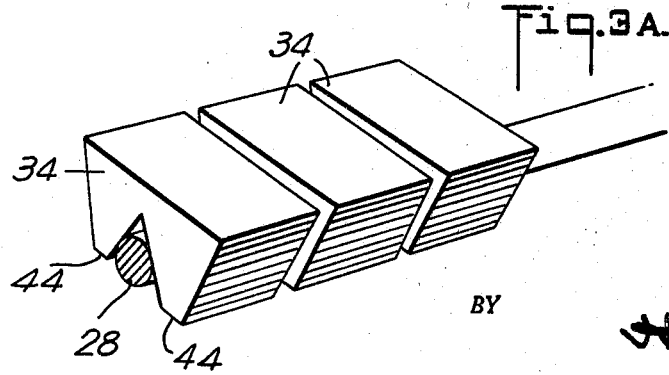

3,496,049
HEAT SEALING MEANS
Kelvin Gordon Anderson, New York, N.Y., assignor to Weldotron Corporation, Newark, N.J., a corporation of New Jersey
Continuation-in-part of application Ser. No. 555,903, June 7, 1966. This application July 26, 1966, Ser. No. 567,897
Int. Cl. B32b 31/00
U.S. Cl. 156—497        4 Claims

ABSTRACT OF THE DISCLOSURE

Apparatus for heat sealing thermoplastic films for packaging various goods. Provision is made for applying a fluid coolant stream to the films in the vicinity of the sealing line and in predetermined relation to the sealing operation.

---

This application is a continuation-in-part of Ser. No. 555,903, filed June 7, 1966, now abandoned.

This invention relates to the impulse heat sealing of thermoplastic films, especially for wrap packaging various goods.

Two difficulties or defects which frequently occur in the trim sealing of thermoplastic films, especially in packaging applications, involve the tendency of the seal to remain in a semi-molten state until cooled sufficiently, and also the tendency of certain films to stick to the sealing jaws and to leave a sticky residue on the sealing jaws. The effect of the seal cooling time is to limit the maximum speed of operation since no stress can be put on the seal until it has cooled sufficiently to withstand such stress. The effect of the build-up of residue on the sealing elements is to gradually reduce the effectiveness of the sealing elements until no further sealing is possible until the residue is removed.

The primary object of the present invention is to provide a method and apparatus for obviating the above-mentioned difficulties. Briefly stated, this object is accomplished, in accordance with the present invention, by directing a stream of cooling fluid on the sealed plies of the plastic films in the vicinity of the sealing line.

More particularly, the method of the present invention comprises the use of apparatus which includes first and second relatively movable confronting members having outer opposed surfaces for releasably clamping surface portions of the film plies therebetween, electrically heated means adjacent at least one of said surfaces for heat sealing said plies along the predetermined sealing line when the plies are clamped between said opposed surfaces, and means for operating said heat sealing means, and the method includes the operation of directing a stream of cooling fluid against at least one of said outer surfaces in the vicinity of said sealing line in predetermined timed relation to the operation of the heat sealing means of said apparatus.

The heating sealing apparatus for sealing superimposed plies of thermoplastic film to each other along a predetermined sealing line, in accordance with the present invention, comprises first and second relatively movable confronting members having outer opposed surfaces for releasably clamping surface portions of said plies therebetween, electrically heated means adjacent at least one of said surfaces for heat sealing said plies along said predetermined line when said plies are clamped between said opposed surfaces, means for operating said heat sealing means, and means intermittently operable in predetermined relation to said operations of the heat sealing means for cooling the sealed film plies in the vicinity of said sealing line.

The presently preferred way of practicing the invention is to provide on the movable member which carries electrically heated sealing means a chamber from which a stream of coolant passes through a multiplicity of minute openings to the outer surfaces of said member, the coolant being supplied to the chamber and from the latter to said outer surface intermittently immediately following each sealing operation, but while the plies are still clamped between the relatively movable members thus cooling the seal and the heating means so as to reduce the sealing time and thus depositing a thin coating of the coolant, which is preferably air-atomized silicone oil, on the electrically energized sealing element and on the adjacent portions of the movable member. The net effect is a rapid cooling of the seal together with elimination of residue, since the silicone oil film acts as a release agent and eliminates sticking.

Another way of practicing the invention is to blow the liquid spray through small openings in the cover layer on the companion pressure jaw. Yet another way is to mount tubes on either the upper jaw or the lower jaw, or on both jaws, and to blow the liquid spray, through small openings in the tubes, toward the opposite jaw.

In the accompanying illustrative drawings:

FIG. 1 is a perspective view of an impulse electric sealer which may be utilized in practicing the present invention;

FIG. 2 is a front view of the companion clamp-sealing jaws of the sealer;

FIG. 3 is a sectional view on the line 3—3 of FIG. 2;

FIG. 3A is a fragmentary perspective view of part of the apparatus;

FIG. 4 is a view similar to FIG. 2 but showing clamp-sealing jaws of a different form;

FIG. 5 is a sectional view on the line 5—5 of FIG. 4;

FIG. 6 is a schematic illustration of another way of practicing the invention; and FIG. 7 is a schematic diagram of the circuitry.

In FIG. 1 an impulse sealing machine of the nature disclosed in U.S. Patent No. 3,135,077 to Martin Siegel and Seymour Zelnick is generally indicated at 10 and comprises a base 12 and a sealing assembly 14 pivotally mounted thereon by the mounts 16. The said base portion includes a support platform 18 for the support of articles to be packaged between the films of thermoplastic as indicated at 19. The sealing assembly 14 comprises sealing bars 20 and 22 respectively, and an actuating handle 24. Thus members 20 and 31 and, similarly, members 22 and 33 constitute relatively movable members which are in confronting relation. Impulse trim sealing elements 28 and 30 which are preferably in the form of wire of suitable high electric resistance material are positioned as shown on the sealing bars 20 and 22, respectively and cooperate with the backing members 31 and 33, respectively. In the form of the invention illustrated by FIGS. 2 and 3 the electrically heated sealing means, namely the wire 28 is positioned in the V-shaped recesses of a series of ceramic members 34 which are disposed in side by side relation in a dove-tailed groove 36 in the aluminum bar 20 and collectively form said V-shaped recess. In this respect the arrangement is similar to the arrangement shown in the U.S. application of Seymour Zelnick, Ser. No. 331,257, filed Dec. 17, 1963 now U.S. Patent No. 3,262,833.

Bar 20 is provided with a chamber 38 which extends for substantially the full length of said bar and has an inlet passage 40 to which a coolant supply tube 42 is connected for the controlled supply of coolant to chamber 38 and from chamber 38 to the outer clamping surface constituted by the outer surface portions 44 of the ceramic member 34 at opposite sides of the V- shaped recess. There are minute spaces 46 between adjacent ceramic member 34 for the passage of the coolant from chamber 38 to said spaces with which said chamber communicates. The bar 22 is provided with a coolant receiving chamber similar to chamber 38 of bar 20 and communicates with the recess between the adjacent ceramic members mounted on said bar 22. The electrically heated sealing member 30 is arranged in respect to the ceramic members in the same way as the electrically heated sealing member 28 of bar 20. It will be understood that the electrically heated sealing members 28 and 30 are held under tension in any suitable way, for example, as described in the U.S. patent application of Seymour Zelnick, Ser. No. 374,108, filed June 10, 1964 now U.S. Patent No. 3,299,251.

The pressure bars 31 and 33 which are supported on the base 12, as illustrated by FIG. 1 are each provided with a layer 48 of silicone rubber on the outer surface of which is secured a "Teflon" tape 50.

In the form of the invention illustrated by FIGS. 4 and 5 the electrically heated resistance sealing member 28' is disposed at the outer surface of an electrical insulation layer 34' preferably a layer of "Teflon" or similar material. The chamber 38' for the supply of the coolant is substantially the same as the chamber 38 except that the chamber 38' and insulation 34' are provided with a multiplicity of registering openings 52 and 54 through which the coolant passes to the outer surface of layer 34'. The pressure bars in this form of the invention can be the same as the pressure bars 31 and 33 in the form of the invention illustrated by FIGS. 1 to 3, each of said pressure bars having a layer 48 of silicone rubber and a cover layer 52 of "Teflon."

FIG. 6 indicates another way in which the present invention may be practiced. The sealing bar 20", and also the sealing bar 22, may be provided with tubes 56 attached to said bar and extending longitudinally thereof and provided with a multiplicity of small apertures 58 through which the coolant passes from the tubes to the surface of the pressure bar 31 or 33. It will be understood that said tubes 56 are connected to a manifold (not shown) provided with an inlet for the passage of the coolant from the source to the manifold and from the manifold to said tubes. It will be noted that the movable bar on which the tubes 56 are carried is provided with insulation material 34" for insulating the heat sealing wire 28' from the metal bar 20".

It is within the scope of the present invention to transmit the coolant to the outer surface of the pressure bars 31 and 33 by providing a multiplicity of openings through said bars including the silicone rubber and "Teflon" layers instead of or in addition to the passage of the coolant through means carried by the movable members on which the electric heating means is mounted, a coolant-supply chamber similar to chamber 38 or 38' being positioned below each pressure bar.

Referring now to FIG. 7 of the drawings the operation of the sealing and cooling cycle will now be described, reference also being had to FIG. 1 of the drawings. When the sealing assembly 14 is moved downwardly from the position shown in FIG. 1 to the position for clamping the superimposed plies of thermoplastic material between the companion clamping and pressure bars 20, 31 and 22, 33, respectively, the switch 60 is closed by engagement therewith of bar 22 or by a part carried thereby, thus starting the cycle of operation of the machine. When the switch 60 is closed, a time delay relay 62 is energized, starting its timing period, and a control relay 64 is energized through the normally closed contacts 66–1 of a control relay 66, and the normally closed contacts 62–1 of the time delay relay. A buzzer 67 or other indicator is also energized.

When the control relay 64 is energized it closes its normally open contacts 64–1 and 64–2 to energize the primary of a transformer 68. One secondary of this transformer energizes the sealing member 28, and another secondary energizes the sealing member 30. The energized sealing members form the seal in the superposed, clamped plies.

The closure of the switch 60 also energizes the primary of a transformer 70, whose secondary is coupled in series to the control relay 66 and its normally open contacts 66–2. Means for measuring the heating of the front sealing element 28 may be provided as disclosed in U.S. patent application 374,108 of Seymour Zelnick, filed June 10, 1964, now Patent No. 3,299,251 and include a fixed contact 74 and a movable contact 76 carried by an insulator which moves in response to the expansion of the sealing means 28. Thus, the transformer 68 may be deenergized by the first occurring of either contact 74 and 76 meeting to shunt the open contacts 66–2, to energize the control relay 66, to open its normally closed contacts 66–1, to deenergize the control relay 64, to open its contacts 64–1 and 64–2, and closing contacts 66–2 to keep the relay 66 energized; or by the timing relay timing out to open its normally closed contacts 62–1, to deenergize the relay 64, to open the contacts 64–1 and 64–2.

When the timing relay times out it also closes its normally open contacts 62–2 to energize a solenoid 78. This solenoid is part of the solenoid operated valve in the coolant system, which cause the silicone mist to be sprayed on the sealing members.

When the sealing assembly 14 is raised, the switch 60 is opened and the timing relay 62 resets, deenergizing the solenoid 78, and resetting the system for a new cycle of operation.

It will be appreciated that the invention may be utilized with sealing members which are either pulsed or continuously heated. In the case of pulsed sealing members, the cooling spray should be provided immediately after the termination of the heat pulse, and while the plies are still clamped by the clamping and pressure bars. In the case of continuously heated sealing members, the spray should be provided a short time interval after clamping, and while the plies are still clamped by the clamping and pressure bars to permit the seal to be formed before the cooling effected by the spray.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Heat sealing apparatus for sealing superimposed plies of thermoplastic film to each other along a predetermined sealing line, comprising upper sealing bars in a relatively movable confronting relation to stationary lower sealing bars having outer opposed surfaces for releasably clamping surface portions of said plies therebetween, electrically heated means adjacent at least one of said surfaces for heat sealing said plies along said predetermined line when said plies are clamped between said opposed surfaces, means for operating said heat sealing means, and coolant-applying means operable in predetermined relation to said operation of the heat sealing means for applying an atomized liquid to the sealed film plies in the vicinity of said sealing line for cooling the sealed film plies.

2. Heat sealing apparatus comprising upper sealing bars in a relatively movable confronting relation to stationary lower sealing bars having outer opposed surfaces for releasably clamping surface portions of superimposed plies of thermoplastic film therebetween, electrically heated means adjacent at least one of said surfaces for heat sealing said plies along a predetermined line when said plies are clamped between said opposed surfaces, a plurality of recessed ceramic members are carried in side by side relation by one of said confronting members, and have outer surfaces which collectively form one of said opposed surfaces, said electrically heating means being disposed at least partly in said ceramic members and extending along the sealing line, said ceramic members being arranged with minute spaces between adjacent ceramic members, means for operating said heat sealing means and means for cooling the film comprising means for blowing a cooling fluid through said spaces between the ceramic members.

3. Heat sealing apparatus according to claim 2, wherein a chamber is carried by one of said bars in position rearwardly of said ceramic members and is in communication with the spaces between said ceramic members and wherein the cooling fluid is introduced into said chamber intermittently for passage from said chamber through the spaces between said ceramic members.

4. Heat sealing apparatus comprising upper sealing bars in a relatively movable confronting relation to stationary lower sealing bars having outer opposed surfaces for releasably clamping surface portions of superimposed plies of thermoplastic film therebetween, electrically heated means adjacent at least one of said surfaces for heat sealing said plies along a predetermined line when said plies are clamped between said opposed surfaces, coolant-applying means operable in a predetermined relation to said operation of the heat sealing means for applying an atomized liquid to the sealed film plies in the vicinity of said sealing line, control means coupled to said clamping members, said means for operating said heat sealing means and said cooling means, for actuating said operating means to energize said heat sealing means after said clamping members have clamped the superimposed plies and to deenergize said heat sealing members before said clamping members unclamp the plies, and for actuating said cooling means to cool the plies after they have been heated and before said clamping members unclamp the plies.

References Cited

UNITED STATES PATENTS

| | | | |
|---|---|---|---|
| 3,106,487 | 10/1963 | Frost | 117—138.8 |
| 3,115,731 | 12/1963 | Blythe et al. | 156—583 XR |
| 3,135,077 | 6/1964 | Siegel et al. | 156—515 XR |
| 3,162,565 | 12/1964 | Buchner | 156—583 XR |
| 3,262,833 | 7/1966 | Zelnick | 156—583 |
| 3,299,251 | 1/1967 | Zelnick | 156—366 XR |
| 3,406,236 | 10/1968 | Kniege | 264—338 |
| 2,716,074 | 8/1955 | Mick et al. | 117—65 |
| 2,960,425 | 11/1960 | Sherman | 156—82 |
| 3,011,217 | 12/1961 | Carlson | 264—53 |

JOHN T. GOOLKASIAN, Primary Examiner

H. F. EPSTEIN, Assistant Examiner

U.S. Cl. X.R.

156—289, 311, 498, 583